Figure 1:
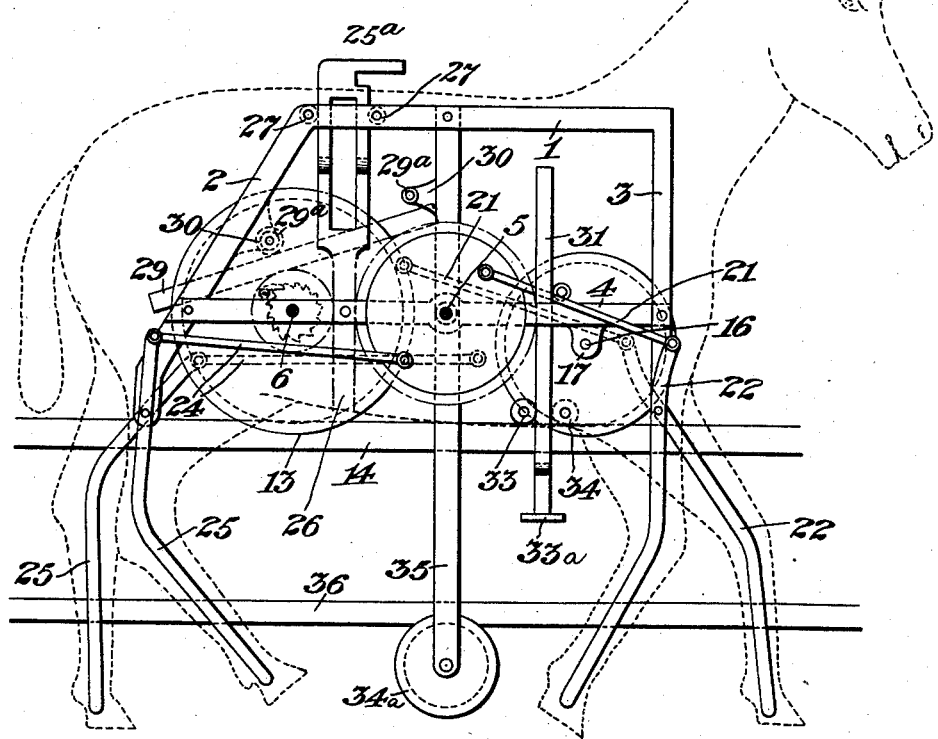

No. 717,202. Patented Dec. 30, 1902.
F. HÜBSCH.
MECHANICAL TOY.
(Application filed Sept. 17, 1902.)

(No Model.)

Witnesses
Chas. G. Clagett
J. O. McCleary

Inventor
Franz Hübsch
By his Attorney
J. R. Littell

THE NORRIS PETERS CO., PHOTO-LITHO., WASHINGTON, D. C.

UNITED STATES PATENT OFFICE.

FRANZ HÜBSCH, OF VIENNA, AUSTRIA-HUNGARY, ASSIGNOR TO JOSEPH HÜBSCH, OF TARRYTOWN, NEW YORK.

MECHANICAL TOY.

SPECIFICATION forming part of Letters Patent No. 717,202, dated December 30, 1902.

Application filed September 17, 1902. Serial No. 123,701. (No model.)

*To all whom it may concern:*

Be it known that I, FRANZ HÜBSCH, a subject of the Emperor of Austria-Hungary, residing at Vienna, Austria-Hungary, have invented certain new and useful Improvements in Mechanical Toys, of which the following is a specification.

This invention relates to mechanical toys, and more particularly to a toy animal provided with propelling mechanism adapted to be operated by the movement of the rider.

The invention comprises an animal figure (that of a horse being shown in the drawings) and propelling mechanism of novel construction, as hereinafter fully described, and particularly set forth in the appended claims.

Figure 2:
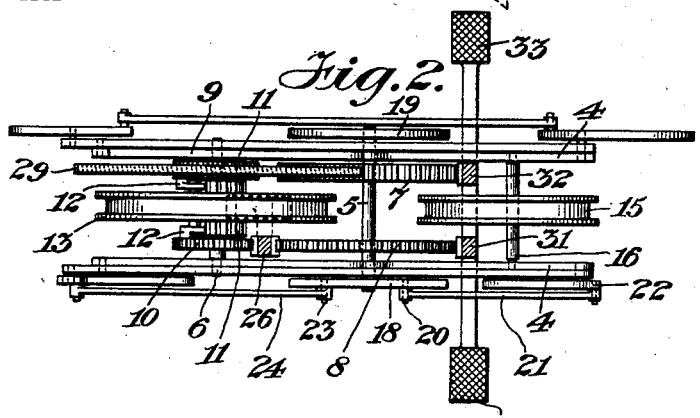

In the accompanying drawings, which form part of this specification, Figure 1 is a side elevation of propelling mechanism embodying the invention, the figure of the animal being outlined by dotted lines; and Fig. 2 is a top plan view of the mechanism, partly in horizontal section.

Corresponding parts in both figures are denoted by the same reference characters.

Within the body of the animal figure is arranged a frame comprising parallel horizontal bars 1, rearwardly-inclined bars 2, vertical bars 3, depending from the front ends of the bars 1, and parallel side bars 4. Two parallel transverse shafts 5 and 6 are supported in bearings formed in the side bars 4 of the frame. Upon the shaft 5 are mounted two concentric gear-wheels 7 and 8, and upon the shaft 6 are mounted gear-pinions 9 and 10 and concentric ratchet-wheels 11, adapted to be engaged by gravity-pawls 12, pivotally secured to the inner sides of the gear-pinions. Between the gear-pinions 9 and 10 a grooved wheel 13 is mounted upon the shaft 6, said wheel being adapted to travel upon a track 14 in alinement with a second grooved wheel 15, mounted upon a shaft 16, supported in bracket-bearings 17, depending from the side bars 4 of the frame.

18 and 19 designate crank-disks mounted on the ends of the shaft 5 outside of the frame-bars 4 and connected by wrist-pins 20 to pitmen 21, pivotally secured to the upper ends of levers 22, fulcrumed on the forward portion of the frame. The crank-disks 18 and 19 are also connected by wrist-pins 23 to the forward ends of pitmen 24, the rear ends of which are pivotally secured to levers 25, fulcrumed to the rear portion of the frame.

$25^a$ designates a saddle-frame having a depending rack 26, extending down between the gear-wheel 8 and the gear-pinion 10 and meshing therewith. This saddle-frame is adapted to have a vertical reciprocating movement and is guided adjacent to its upper end between antifriction-rollers 27.

29 designates a bar having rack-teeth on its under side meshing with the gear-pinion 9 and also with the gear-wheel 7, the movement of said rack-bar being guided by rollers $29^a$, mounted in brackets 30 of the frame. This rack-bar 29 transmits motion from the gear 7 through the pinion 11 to the grooved wheel 13. Two vertically-disposed rack-bars 31 and 32 are movably supported within the frame by rollers 33 and 34 and mesh with the gear-wheels 7 and 8. The lower ends of the racks 31 and 32 are provided with pedals or stirrups $33^a$. A guard-roller $34^a$, mounted upon a depending bar 35, travels on the under side of a second track-rail 36 to support and guide the structure in its travel.

The operation of the mechanism constructed as thus described is as follows: The levers 22, representing the front legs of the animal, and the levers 25, shaped to correspond to the hind legs, are actuated through the medium of the pitmen 21 and 24, respectively, and the oscillation of the crank-disks 18 and 19, said motion of the disks being accomplished by the up-and-down motion of the saddle-frame and stirrup rack-bars and movement of the rack-bar 28, said rack-bars meshing with the gear-wheels 7 and 8 and the gear-pinions 9 and 10, as has been described. The pawl-and-ratchet mechanism prevents backward movement of the gearing, and it will be apparent that the movement of the body and feet of the rider upon the saddle-frame and stirrups insures the propulsion of the device along the tracks, the legs of the animal simulating the action of a live animal.

It will be obvious that in case a figure having only two legs is employed the construction of the mechanism may be greatly simplified, and I would have it understood that the invention is not restricted to the exact construction shown, but includes also all such variations and modifications in the details as may fall within the terms and scope of the following claims.

Having thus described my invention, I claim and desire to secure by Letters Patent—

1. A mechanical toy, comprising an animal figure, and propelling mechanism, consisting of a grooved track-wheel, gearing for revolving said track-wheel, and movable rack-bars for operating said gearing.

2. A mechanical toy, comprising an animal figure, and propelling mechanism, consisting of a supporting-frame within the figure, parallel shafts having bearing in said frame, a track-wheel on one of said shafts, gearing for driving said track-wheel, and a saddle-frame having a rack-bar, and stirrup rack-bars for driving said gearing.

3. The combination with a track, of an animal figure, a frame within the body of the figure, shafts supported in bearings of the frame, grooved wheels adapted to travel on said track, gearing for driving said wheels, and rack-bars adapted to be operated by the rider to operate the gearing.

4. The combination with a track, of an animal figure, a frame arranged therein, grooved track-wheels, driving-gear for the track-wheels, and rack-bars operated by the rider and meshing with said gearing, and an inclined rack-bar also meshing with and transmitting motion between members of the driving-gear.

5. The combination with a track, of an animal figure, a frame arranged therein, wheels supported on said track, gearing for driving the track-wheels, levers pivotally secured to said frame, and means for moving said levers as the device is propelled along the track.

6. The combination with a track, of an animal figure, a frame arranged therein, levers pivotally secured to the frame, shafts supported in bearings of the frame, crank-disks on one of said shafts, pitmen connecting said disks and levers, wheels supported on said track, and driving mechanism for said wheels.

7. The combination with a track, of an animal figure, a frame arranged therein, levers pivotally secured to the frame, shafts supported in bearings of the frame, crank-disks on one of said shafts, pitmen connecting said disks and levers, grooved wheels supported on the track, driving-gearing for said wheels, rack-bars meshing with said gearing, and guide-rollers for said rack-bars.

In testimony whereof I have signed my name in the presence of the subscribing witnesses.

FRANZ HÜBSCH.

Witnesses:
WILHELM BERGER,
ALVESTO S. HOGUE.